United States Patent
Hiasa

(10) Patent No.: US 10,354,369 B2
(45) Date of Patent: Jul. 16, 2019

(54) IMAGE PROCESSING METHOD, IMAGE PROCESSING APPARATUS, IMAGE PICKUP APPARATUS, AND STORAGE MEDIUM

(71) Applicant: CANON KABUSHIKI KAISHA, Tokyo (JP)

(72) Inventor: Norihito Hiasa, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 51 days.

(21) Appl. No.: 15/684,468

(22) Filed: Aug. 23, 2017

(65) Prior Publication Data
US 2018/0061020 A1 Mar. 1, 2018

(30) Foreign Application Priority Data
Aug. 25, 2016 (WO) .................. PCT/JP2016/074723

(51) Int. Cl.
*G06T 5/00* (2006.01)
*G06T 9/00* (2006.01)
(Continued)

(52) U.S. Cl.
CPC ................ *G06T 5/003* (2013.01); *G06T 3/60* (2013.01); *G06T 5/20* (2013.01); *G06T 5/50* (2013.01);
(Continued)

(58) Field of Classification Search
CPC ......... G06T 5/003; G06T 5/006; G06T 5/007; G06T 2207/20084; G06T 9/002; CPC ... G06T 2207/20081; H04N 1/6027; H04N 1/60; G06N 20/00; G06N 3/02; G06N 3/0481
See application file for complete search history.

(56) References Cited

U.S. PATENT DOCUMENTS

2008/0137947 A1* 6/2008 Sawada .............. H04N 5/23287
382/167
2010/0283874 A1* 11/2010 Kinrot ..................... G06T 5/003
348/242
(Continued)

FOREIGN PATENT DOCUMENTS

JP 04-200081 A 7/1992
JP 11-31214 A 2/1999
(Continued)

OTHER PUBLICATIONS

Lecun, Y., et al, "Gradient-Based Learning Applied to Document Recognition", Proc. of the IEEE, Nov. 1998, pp. 1-46.
(Continued)

*Primary Examiner* — Kenny A Cese
(74) *Attorney, Agent, or Firm* — Canon U.S.A., Inc. IP Division

(57) ABSTRACT

An image processing method of highly accurately correcting an optical degradation of an image pickup apparatus while also suppressing adverse effects is provided. The image processing method includes a step of obtaining a partial area of an input image shot by using an image pickup apparatus, a step of obtaining previously learnt correction information varying in accordance with a position of the partial area, and a correction step of generating a corrected partial area in which an optical degradation of the partial area caused by the image pickup apparatus is corrected by using the partial area and the correction information.

22 Claims, 9 Drawing Sheets

(51) Int. Cl.
*G06N 3/02* (2006.01)
*G06N 3/04* (2006.01)
*G06T 3/60* (2006.01)
*G06T 5/20* (2006.01)
*G06T 5/50* (2006.01)

(52) U.S. Cl.
CPC ............ *G06N 3/02* (2013.01); *G06N 3/0481* (2013.01); *G06T 9/002* (2013.01); *G06T 2207/10028* (2013.01); *G06T 2207/20081* (2013.01); *G06T 2207/20084* (2013.01); *G06T 2207/20201* (2013.01)

(56) References Cited

U.S. PATENT DOCUMENTS

2016/0027157 A1* 1/2016 Naruse ................... H04N 9/045 382/167
2019/0073563 A1* 3/2019 Chapados ............... G06F 15/00

FOREIGN PATENT DOCUMENTS

| JP | 2001-197332 A | 7/2001 |
| JP | 2013-025473 A | 2/2013 |
| JP | 2015-216576 A | 12/2015 |

OTHER PUBLICATIONS

Hinton, G.E., et al, "A fast learning algorithm for deep belief nets", Neutral Comput., Jul. 2006, pp. 1527-1554, vol. 18, No. 7.

Hinton, G.E., et al, "Reducing the Dimensionality of Data with Neural Networks", Science, Jul. 28, 2006, pp. 504-507, vol. 313, No. 5786.

Simard, P.Y., et al, "Best Practices for Convolutional Neural Networks Applied to Visual Document Analysis", Proceedings of the Seventh International Conference on Document Analysis and Recognition, 2003.

Krizhevsky, A., "Learning Multiple Layers of Features from Tiny Images", Apr. 8, 2009; https://www.cs.toronto.edu/~kriz/learning-features-2009-TR.pdf.

* cited by examiner

IMAGE PROCESSING METHOD, IMAGE PROCESSING APPARATUS, IMAGE PICKUP APPARATUS, AND STORAGE MEDIUM

TECHNICAL FIELD

The present invention relates to an image processing method of correcting an optical degradation such as an aberration or a diffraction generated by an optical system of an image pickup apparatus with regard to an image shot by using the image pickup apparatus.

BACKGROUND ART

Along with enhancement in a definition of a display apparatus, further enhancement in an image quality of an image shot by using an image pickup apparatus (shot image) is desired. However, an optical degradation (blur) such as an aberration or a diffraction generated by an optical system in the image pickup apparatus is generated in the shot image. For this reason, information of an object space is lost, which leads to decrease in the image quality.

A large number of techniques for correcting the optical degradation (blur) of the shot image and obtaining an image having a still higher definition have been proposed up to now. PTL 1 proposes a technique for correcting the aberration by using a Wiener filter. Since the aberration changes depending on an image height, blur correction filters respectively set for a plurality of image heights are used. PTL 2 proposes a technique using a Richardson-Lucy (RL) method instead of the Wiener filter.

CITATION LIST

Patent Literature

PTL 1: Japanese Patent Laid-Open No. 2015-216576
PTL 2: Japanese Patent Laid-Open No. 2013-025473

Non Patent Literature

NPL 1: Y. LeCun, et al. "Gradient-based Learning Applied to Document Recognition", Proc. of The IEEE, 1998.
NPL 2: G. E. Hinton, et al. "A fast learning algorithm for deep belief nets", Neural Comput. 2006 July; 18(7): 1527-54.
NPL 3: G. E. Hinton & R. R. Salakhutdinov (2006 July 2028). "Reducing the Dimensionality of Data with Neural Networks", Science 313(5786): 504-507.
NPL 4: P. Y. Simard, et al. "Best Practices for Convolutional Neural Networks Applied to Visual Document Analysis", ICDAR 2003.
NPL 5: A. Krizhevsky, "Learning Multiple Layers of Features from Tiny Images", 2009, https://www.cs.toronto.edu/-kriz/learning-features-2009-TR.pdf Since the technique in PTL 1 is a technique using a so-called inverse filter, it is not possible to reconstruct a frequency component in which an MTF (Modulation Transfer Function) of the optical degradation is close to 0 in principle. On the other hand, according to PTL 2, since the RL method is super resolution processing including an estimation, it is possible to reconstruct the frequency component in which the MTF is close to 0 too. It should be noted however that an issue occurs in both PTL 1 and PTL 2 that noise amplification and ringing (including overshoot and also undershoot) are generated as adverse effects. Therefore, even when sense of resolution is improved, the image quality is decreased by these adverse effects.

SUMMARY OF INVENTION

An image processing method according to one embodiment of the present invention includes a step of obtaining a partial area of an input image shot by using an image pickup apparatus, a step of obtaining previously learnt correction information varying in accordance with a position of the partial area, and a correction step of generating a corrected partial area in which an optical degradation of the partial area caused by the image pickup apparatus is corrected by using the partial area and the correction information, in which, when N is set as an integer higher than or equal to 2 and n is set as an integer from 1 to N, the correction step includes generating intermediate data by sequentially executing an n-th linear conversion based on each of a plurality of linear functions based on the correction information and an n-th non-linear conversion based on a non-linear function until n becomes N from 1 with respect to the partial area and generating the corrected partial area by executing the (N+1)-th linear conversion by one or more linear functions based on the correction information with respect to the intermediate data.

In addition, an image processing apparatus including an image processing unit that executes the above-described image processing method, an image pickup apparatus, a program that causes a computer to execute the above-described image processing method, and a storage medium that store the program are also one of embodiments of the present invention.

Further features of the present invention will become apparent from the following description of exemplary embodiments with reference to the attached drawings.

DESCRIPTION OF EMBODIMENTS

Hereinafter, embodiments of the present invention will be described in detail with reference to the drawings. In the respective drawings, the same reference signs are assigned to the same components, and duplicate descriptions will be omitted.

First, a gist of the present invention will be described prior to descriptions of the specific embodiments. According to the present invention, an optical degradation in an image shot by using an image pickup apparatus (shot image) is corrected by using deep learning. The optical degradation herein refers to an aberration or a diffraction generated in an optical system in the image pickup apparatus or a degradation caused by defocus. It should be noted that the optical system in the image pickup apparatus includes not only a lens but also an optical element such as a low-pass filter.

Here, a difference between an image processing method using the deep learning according to the present invention and the image processing method according to PTL 1 and PTL 2 will be simply described. According to the Wiener filter (PTL 1), a blurred image is input to a single function to obtain a blur correction image. According to the RL method (PTL 2), a blurred image is input to a single function, an output thereof is input to the same function as a new input, and it is repeated to obtain a blur correction image. In contrast to these, according to the deep learning, processing is repeated in which a blurred image is input to a large number of different functions, and those outputs are further input to a large number of functions different from the above-described functions. A detail of the processing will be described below. Since the deep learning uses the multiple functions in contrast to the techniques used in PTL 1 and PTL 2 in this manner, representability of a model is high. For this reason, a solution that is not describable by the Wiener filter or the RL method can also be represented.

Furthermore, according to the deep learning, parameters used in the respective functions are automatically set as optimal values by the learning. According to the techniques in PTL 1 and PTL 2, it is necessary to manually determine parameters, and it is not easy to obtain optimal values in respective solution spaces.

From these reasons, the optical degradation correction processing having little adverse effects and also high correction effects which are difficult to achieve by the techniques described in PTL 1 and PTL 2 can be performed by using the deep learning.

First Embodiment

Figure 2:
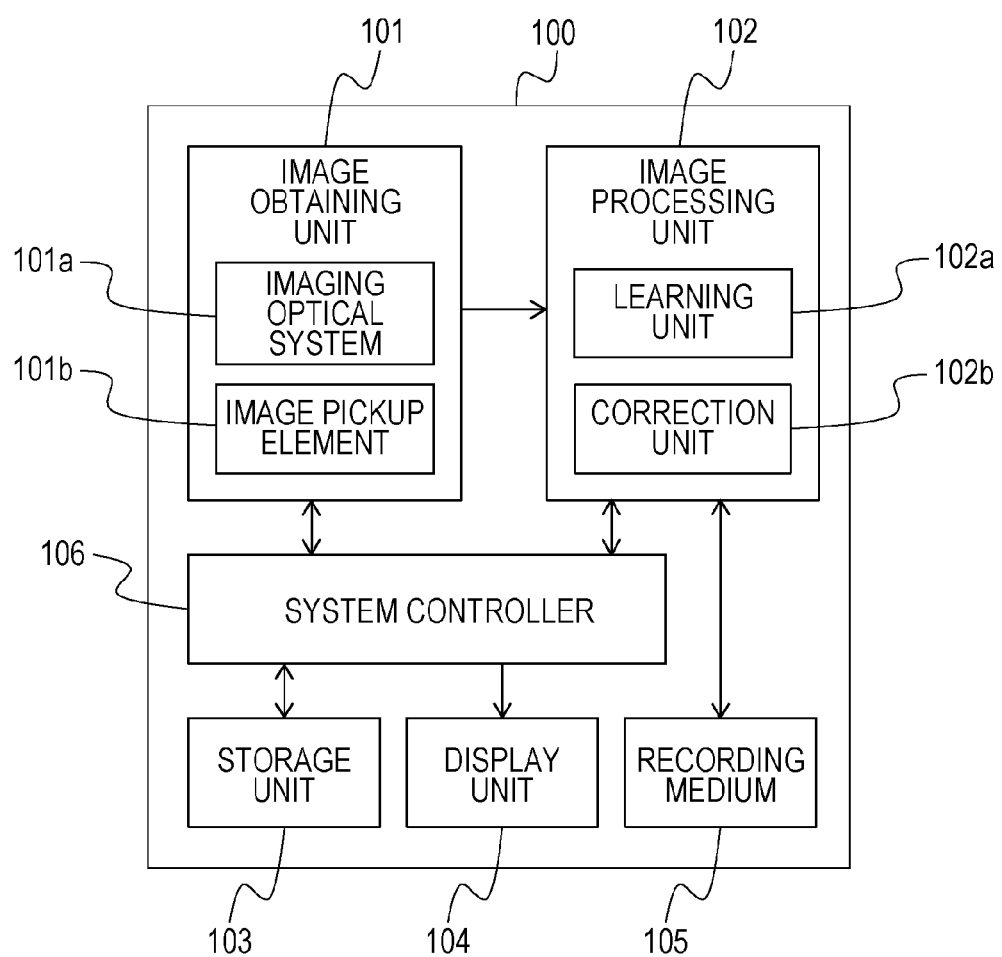
FIG. 2 is a block diagram of an image pickup apparatus according to the first embodiment.
Figure 3:
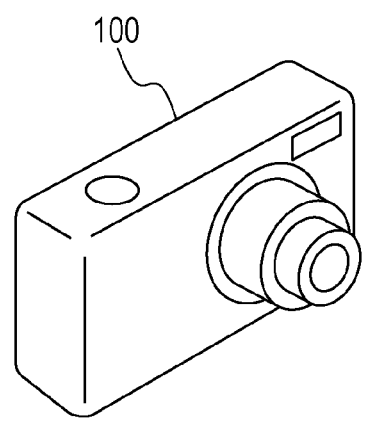
FIG. 3 is an external appearance view of the image pickup apparatus according to the first embodiment.

A first embodiment will be described in which the image processing method of the present invention is applied to the image pickup apparatus. FIG. 2 illustrates a basic configuration of an image pickup apparatus 100 according to the first embodiment. FIG. 3 illustrates an external appearance of the image pickup apparatus 100 according to the first embodiment. According to the first embodiment, the optical degradation caused by the aberration and the diffraction of the optical system is set as a correction target. A correction on the defocus will be described according to a second embodiment.

The image pickup apparatus 100 includes an image obtaining unit 101 that obtains information of an object space as an image. The image obtaining unit 101 includes an imaging optical system 101a that collects light from the object space and an image pickup element 101b including a plurality of pixels. The image pickup element 101b is, for example, a CCD (Charge Coupled Device) sensor, a CMOS (Complementary Metal-Oxide Semiconductor) sensor, or the like. The aberration or the diffraction of the imaging optical system 101a, the defocus at the time of the image pickup, or the like affects the image obtained by the image pickup element 101b, and part of the information of the object space is lost. For this reason, the image obtained by the image pickup element 101b will be referred to as a blurred image.

An image processing unit 102 performs blur correction by applying the image processing method according to the present invention to the blurred image (input image). The image processing unit 102 includes a learning unit 102a and a correction unit 102b. At the time of the blur correction, correction information corresponding to the optical degradation (aberration and diffraction) of the imaging optical system 101a which is stored in a storage unit 103 is called to be used. A detail of this processing will be described below. An image on which the blur correction has been performed (corrected image) can be displayed on a display unit 104 such as a liquid crystal display or saved in a recording medium 105.

It should be noted that the blur correction may be performed at a timing when the blurred image is shot by the image obtaining unit 101, or the blur correction may be performed at an arbitrary timing while the blurred image is saved in the recording medium 105. In a case where the blur is corrected at the arbitrary timing, information related to an aperture value or a shooting distance of the imaging optical system 101a at the time of shooting or a focal length (shooting condition information) is saved in the recording medium 105 together with the blurred image. When the shooting condition information is read out, information of the aberration and the diffraction corresponding to the blurred image can be obtained.

In a case where the imaging optical system 101a is a single focus lens instead of a zoom lens, since the focal length is constant, the shooting condition information that does not include information related to the focal length may be obtained. In a case where the defocus is corrected, the shooting condition information that includes distance information of the object space is further needed. In a case where the image pickup apparatus 100 is of a lens interchangeable type, the shooting condition information that includes lens identification information for identifying which lens has been mounted at the time of shooting is needed. It should be noted that the shot image may be a moving image, and the blur correction may be performed on respective frames. The above-described series of control is performed by a system controller 106.

Next, the blur correction performed by the image processing unit 102 will be described. While the previously learnt correction information is used in the blur correction, this learning method will be described below.

Figure 4:
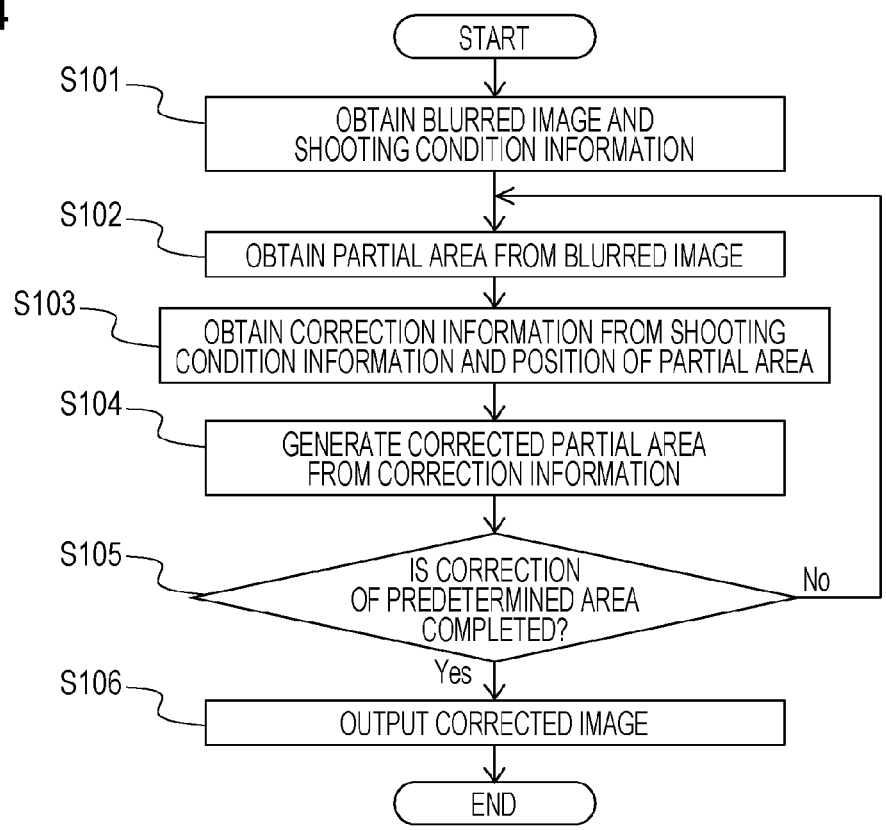
FIG. 4 illustrates a flow of the blur correction according to the first embodiment.

FIG. 4 is a flow chart of the blur correction, which is executed by the correction unit 102b. In step S101, the blurred image (input image) and the shooting condition information of the blurred image are obtained. According to the first embodiment, since the imaging optical system 101a is the zoom lens, the focal length (variable power state, zoom state) is also obtained as the shooting condition information in addition to the aperture value (aperture state) and the shooting distance (focus state). Herein, the aperture state, the focus state, and the variable power state are collectively referred to as a lens state. In addition, in a case where the image pickup element 101b is structured in a Bayer array of RGB (Red, Green, Blue), the blurred image may be either an image before demosaicing or an image after demosaicing.

In step S102, a partial area corresponding to part of the blurred image is obtained. The blur correction is performed while the partial area is set as a unit.

In step S103, the correction information for correcting the optical degradation of the partial area is obtained from the shooting condition information and a position of the partial area. Since the optical degradation to be corrected according to the present embodiment which is caused by the aberration and the diffraction in the imaging optical system 101a changes in accordance with the lens state of the imaging optical system 101a and an image height, the correction information also changes in accordance with the change. Therefore, to obtain the correction information corresponding to the partial area, the shooting condition information and information related to the position of the partial area are needed.

Figure 1:
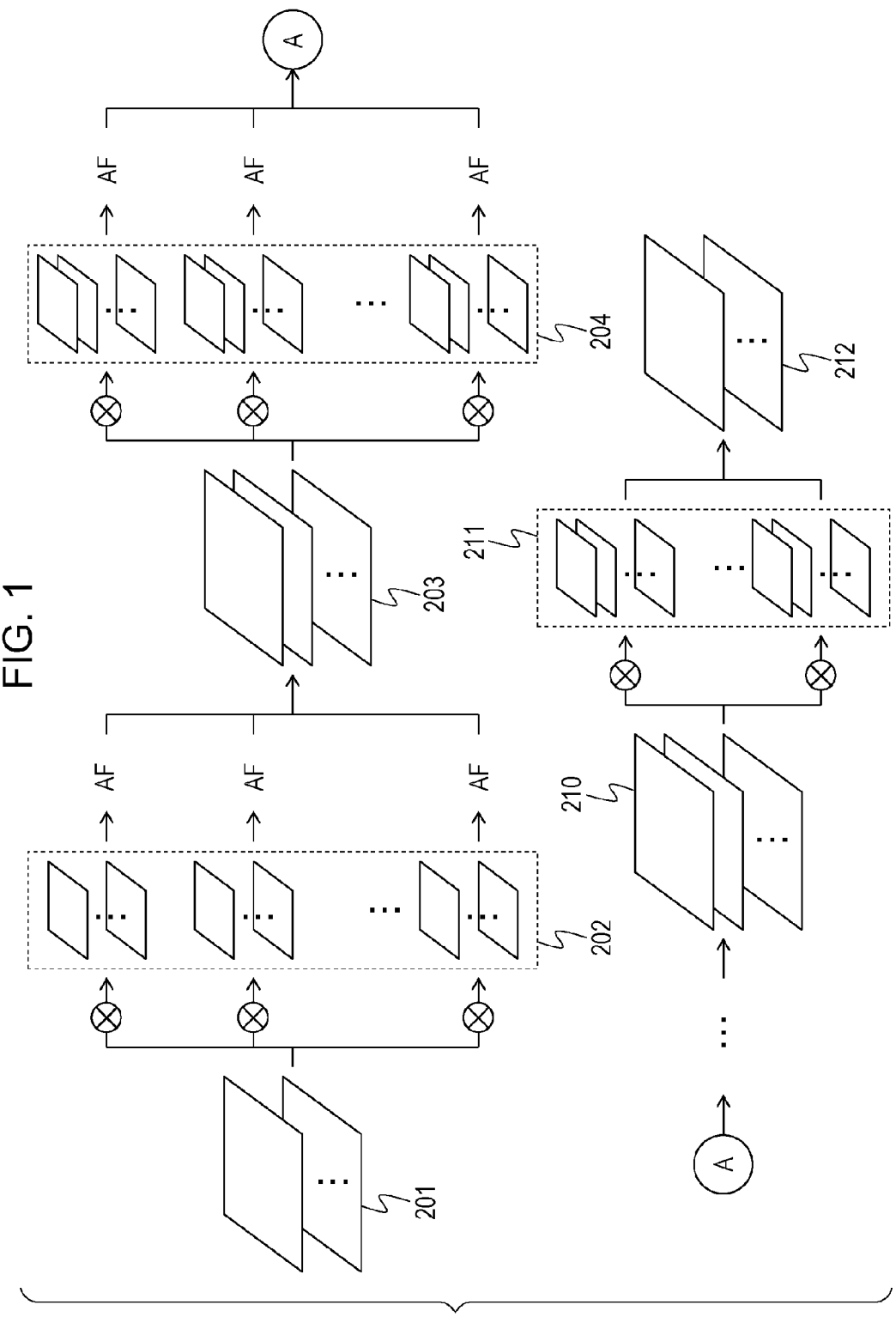
FIG. 1 illustrates a network structure of blur correction according to a first embodiment.

In step S104, a corrected partial area in which the optical degradation in the partial area is corrected is generated by using the correction information. A detail of the blur correction will be described by using FIG. 1. FIG. 1 illustrates a network structure of a CNN (Convolutional Neural Network) corresponding to one of the deep learnings. It should be noted however that the present invention is not limited to the CNN alone. For example, a DBN (Deep Belief Network) or the like may also be used. It should be noted however that, since an action of the optical degradation with respect to the object is described by a convolution, the CNN using the convolution has satisfactory model matching. Details of the CNN and the DBN are respectively described in NPL 1 and NPL 2.

The CNN has a multiple-layer structure, and a linear conversion and a non-linear conversion using the correction information are executed in each layer. Herein, when n is set as an integer from 1 to N, a layer in an n-th order is an n-th layer, and the linear conversion and the non-linear conversion in the n-th layer are respectively referred to as an n-th linear conversion and an n-th non-linear conversion. It should be noted however that N is an integer higher than or equal to 2. In a partial area 201, the convolution with each of a plurality of filters 202 in the first layer is operated (first linear conversion), and thereafter, the conversion is performed by a non-linear function called an activation function (first non-linear conversion). A reason why the plurality of partial areas 201 are illustrated in FIG. 1 is that the partial area has a plurality of channels. According to the first embodiment, the partial area has three channels of RGB. It should be noted however that the number of channels is not limited to this. In addition, even when the partial area has the three channels of RGB, each channel may be individually input to the CNN one by one. In this case, since the aberration and the diffraction change depending on a wavelength of light, the correction information different in each channel is used. In a case where the plurality of channels are collectively input, the different pieces of correction information are used at the same time.

The plurality of filters 202 exist, and the convolution with each of the filters and the partial area 201 is individually calculated. Coefficients constituting the filters 202 are determined from the correction information. The correction information may be the coefficient of the filter itself or may also be the coefficient when the filter is subjected to fitting by a predetermined function. The number of channels of each filter 202 is matched with the partial area 201, and in a case where the number of channels of the partial area 201 is 2 or higher, the filter becomes a three-dimensional filter (the third dimension represents the number of channels). In addition, a constant determined from the correction information (which may take a negative value) may be added with respect to a result of the convolution.

After the linear conversion by the filters 202, the linear conversion based on the activation function (which is indicated by AF in FIG. 1) is executed. The following Expressions (1) to (3) are listed as examples of the activation function f(x).

$$f(x) = \frac{1}{1 + e^{-x}} \quad (1)$$

$$f(x) = \tanh x \quad (2)$$

$$f(x) = \max(x, 0) \quad (3)$$

Expression (1) is referred to as a sigmoid function, Expression (2) is referred to as a hyperbolic tangent function, and Expression (3) is referred to as an ReLU (Rectified Linear Unit). Max in Expression (3) represents a MAX function for outputting a maximum value among arguments. Expressions (1) to (3) are all monotonically increasing functions. In addition, max out may be used as the activation function, but an example of using the max out will be described according to the second embodiment. The partial area on which the linear conversion and the non-linear conversion in the first layer have been executed is referred to as a first conversion partial area 203. Herein, respective channel components of the first conversion partial area 203 are generated from the convolution with respect to the partial area 201 and each of the filters 202. For this reason, the number of channels of the first conversion partial area 203 is the same as the number of filters 202.

In the second layer, the convolution (second linear conversion) with a plurality of filters 204 determined from the correction information and the non-linear conversion (second non-linear conversion) based on the activation function are performed with respect to the first conversion partial area 203 similarly as in the first layer. The filters 204 used in the second layer are not the same as the filters 202 used in the first layer in general. It is sufficient even when the sizes and numbers of the filters are not matched with each other. It should be noted however that the number of channels of the filter 204 and the number of channels of the first conversion partial area 203 are matched with each other. When the similar operation is repeated up to the N-th layer, intermediate data 210 is obtained. Finally, a corrected partial area 212 in which the optical degradation is corrected is obtained from the convolution with respect to the intermediate data 210 and at least one filter 211 and the addition of the constant ((N+1)-th linear conversion) in the (N+1)-th layer. The filter 211 and the constant are also determined from the correction information. The number of channels of the corrected partial area 212 is the same as that of the partial areas 201, and, for this reason, the number of the filters 211 is the same as that of the partial areas 201. The components of the respective channels of the corrected partial area 212 are obtained from the operation including the convolution with respect to the intermediate data 210 and each of the filters 211 (or one filter in some cases too). It should be noted that it is sufficient even when the sizes of the partial area 201 and the corrected partial area 212 are not matched with each other. At the time of the convolution, since data does not exist on an outer side of the partial area, when the operation is performed in only an area where the data exists, a size of the convolution result becomes small. It should be noted however that the size can also be maintained by setting a periodic boundary condition or the like.

Since the CNN includes the activation function (non-linear function), a solution that is not obtainable by an inverse filter of the linear operation can be obtained. In addition, since the number of layers of the deep learning is high with respect to a conventional neural network, a still higher performance can be produced. In general, in a case where 3 or more layers are included (a case where the linear conversion and the non-linear conversion are sequentially executed twice or more), this is referred to as the deep learning. In particular, the existence of the activation function is important for the deep learning to exhibit the performance. This is because, if the activation function does not exist or the function is a linear function, its equivalent single-layer linear conversion exists no matter how much the network is multilayered.

In step S105, a determination on whether or not the blur correction is completed is performed with respect to a predetermined area in the blurred image. In a case where the partial area where the blur correction is not performed exists in the predetermined area, the flow returns to step S102, and the partial area where the blur correction is not performed is obtained to perform processing of generating the corrected partial area (steps S103 and S104). In a case where the blur correction is completed in the entire area of the predetermined area, the flow proceeds to step S106, and the corrected image is output. The image in which the optical degradation of the imaging optical system 101a is corrected can be obtained by the above-described processing.

Next, learning of the correction information will be described by using a flow chart of FIG. 5. The learning may be performed by the image processing unit 102 of the image pickup apparatus 100 before the blur correction or may also be performed by an operation apparatus different from the image pickup apparatus 100. According to the present embodiment, a case where the learning is executed by the learning unit 102a will be described as an example. The learning of the correction information is performed by generating a blurred image in which a reference image is degraded by the optical degradation of the imaging optical system 101a and using a correspondence relationship between them.

In step S201, the information of the optical degradation (according to the first embodiment, the aberration and the diffraction) in the imaging optical system 101a is obtained. As described above, the degradation caused by the aberration and the diffraction changes depending on the lens state, the image height, or the wavelength of the light. For this reason, the lens state, the image height, or the wavelength where the correction information is desired to be obtained is selected, and the information of the optical degradation corresponding to the selected one is obtained. According to the present embodiment, the information of the optical degradation is stored in the storage unit 103. The information of the optical degradation is, for example, information related to a PSF (Point Spread Function), an OTF (Optical Transfer Function), or the like.

In step S202, the reference image is obtained. The number of reference images may be singular or plural. To learn the correction information from the reference image and the image obtained by blurring the reference image, it is desirable that the reference image includes various frequency components. For example, in a case where the reference image does not include an edge, since learning data with which a blurred edge is restored to a sharp edge does not exist, there is a possibility that the blur correction effects with respect to the edge are not sufficiently obtained. In addition, it is desirable that a luminance saturation part where ringing is likely to be generated in the blur correction or the like is also included in the reference image. At this time, to obtain the correct blurred image, it is desirable that the reference image has a luminance value higher than or equal to a saturation value (which is a dynamic range). That is, the reference image having a dynamic range higher than the dynamic range of the input image is preferably used for the learning. This is because, even when the PSF is convolved with respect to the image where the luminance is already saturated, it is not matched with an image obtained by picking up the object space (where the luminance saturation does not exist). When a relationship before and after the blur of the luminance saturation part is learnt, there is an advantage that the ringing is less likely to be generated at the time of the blur correction.

In step S203, a degradation reference image is generated from the reference image by using the information of the optical degradation. When the information of the optical degradation is the PSF, the convolution with respect to the reference image is taken, so that the degradation reference image can be obtained. In the case of the OTF, a product with a spatial frequency spectrum of the reference image is taken, and the degradation reference image can be obtained by performing inverse Fourier transform. In addition, at this time, it is desirable that noise is added to the degradation reference image when necessary. This is because shot noise or the like exists in the actual blurred image obtained by the image pickup element 101b. When the noise is added to the degradation reference image, it is possible to suppress an adverse effect that the noise is amplified at the time of the blur correction. In a case where the number of the reference images is plural, the degradation reference image is generated with respect to each of the reference images.

In step S204, plural pairs (sets) of learning partial areas and learning degradation partial areas are obtained. The learning partial area is obtained from the reference image, and a size is the same as the corrected partial area in step S104. The learning degradation partial area is obtained from the degradation reference image in a manner that a center of the area is set to be at the same position with respect to the learning partial area and the image. The size is the same as that of the partial area of the blurred image in step S102.

In step S205, the correction information is learned from the plural pairs of the learning partial areas and the learning degradation partial areas (which are collectively referred to as leaning pairs). In the learning, the same network structure as the blur correction is used. According to the present embodiment, the learning degradation partial area is input to with respect to the network structure illustrated in FIG. 1, and an error between its output result and the learning partial area is calculated. For example, while an error backward propagation method (Backpropagation) or the like is used, the coefficients of the respective filters used in the first to the n-th layers and the constants to be added (correction information) are updated and optimized such that the error is minimized. Any initial values may be used as the respective filters and the constants. For example, the initial values may be determined from random numbers. Alternatively, pre-training such as Auto Encoder for previously learning the initial value for each layer may be performed. NPL 3 describes the Auto Encoder.

A technique for inputting all the learning pairs to the network structure and updating the correction information by using all of those pieces of information is referred to as batch learning. It should be noted however that this learning method has a drawback that calculation loads become more immense as the number of the learning pairs is increased.

Conversely, a leaning technique for using only the single learning pair for the update of the correction information and using different learning pairs for each update is referred to as online learning. This technique has an advantage that the calculation amount is not increased even when the number of the learning pairs is increased, but an issue occurs instead that an influence of noise existing in the single learning pair is largely affected. For this reason, it is desirable that the learning is performed by using a mini-batch method situated in the middle of these two techniques. According to the mini-batch method, a few pairs are extracted from among all the learning pairs, and the update of the correction information is performed by using those pairs. In the next update, a different few learning pairs are extracted and used. When this is repeated, the drawbacks of the batch learning and the online learning can be decreased, and the high blur correction effects are likely to be obtained.

In step S206, the learnt correction information is output. According to the present embodiment, the correction information is stored in the storage unit 103.

When steps S201 to S206 are executed with respect to the optical degradations of all the lens states, the image heights, and the wavelengths in the imaging optical system 101a, the correction information with respect to the imaging optical system 101a is generated.

The correction information of the optical degradations having little adverse effects and also high correction effects can be learnt by the above-described processing.

It should be noted that, according to the present embodiment, the degradation reference image is generated by the image processing, but this may also be replaced by an image actually shot by using the image pickup apparatus 100. For example, when the reference image is printed and shot by the image pickup apparatus 100, the reference image affected by the optical degradation can be obtained. It should be noted however that, since the number of the learning pairs with respect to a misalignment of the image caused by an arrangement error of the image pickup apparatus 100 or the like and a particular optical degradation (for example, the PSF on an axis) obtained by the single shooting is small, it is desirable that the degradation reference image is generated by the image processing.

In addition, it is desirable that the size of the partial area of the blurred image in step S102 is determined on the basis of the information of the optical degradation affecting the partial area. For example, when it is assumed that the PSF has a spread of approximately m×m pixels, a point image of the object space is blurred and spread to approximately m×m pixels. That is, since pieces of information of the original point image are included in the area of approximately m×m pixels, it is desirable that the size of the partial area is determined such that these pieces of information are included.

Similarly, since the filters are convolved in each layer to correct the optical degradation in the CNN (network structure in FIG. 1), it is not possible to accurately perform the correction when the range having the affected ranges of those filters matched with one another is smaller than the blur amount of the optical degradation. For example, in a case where the number of total layers is 2, a filter size of the first layer is 5×5, and a filter size of the second layer is 3×3, a range that can be used for correcting a certain pixel is 7×7 pixels while the pixel is set as a center. For this reason, with this network structure, it is not possible to perform the high accuracy correction unless the spread of the optical degradation is fewer than or equal to 7 pixels. Therefore, it is desirable that the range for correcting the certain pixel (which is determined by the size of the filter in each layer) is determined on the basis of the spread of the optical degradation.

In more detail, the size of the filter in each layer may be determined so as to satisfy the following conditional expression (4).

$$0 < d\left(-N + \sum_{m=1}^{N+1} s_m\right)^{-1} \leq 1 \tag{4}$$

Where d denotes a spread of the PSF (corresponding to the optical degradation) with respect to the pixel of the blurred image, and N+1 indicates the number of total layers. In addition, $s_m$ denotes a size of the filter used in the m-th linear conversion, and one-dimensional sizes of the filters in the respective first to the (N+1)-th linear conversions are set as $s_1$ to $s_{N+1}$. In a case where filters having multiple sizes are used in a mixed manner in the m-th linear conversion, $s_m$ denotes the largest filter size. An upper limit of Expression (4) indicates that the range that can be used for correcting the certain pixel is larger than or equal to the size of the degradation. It is not possible that a lower limit is surpassed in theory. Herein, the spread d of the PSF is obtained by dividing a width up to a position where a value of the PSF from a gravity center of the PSF attenuates to be lower than or equal to a threshold by a length of the pixel.

Furthermore, in a case where the imaging optical system 101a has a rotational symmetry with respect to an optical axis, shapes of the aberration and the diffraction are not changed by an azimuth (the PSF rotates by the azimuth). Therefore, the same correction information can be used with respect to the partial area having the same image height, and advantages of alleviation of the leaning loads and capacity reduction of the correction information are obtained. To realize this, the following two methods are conceivable. The first method is to rotate the partial area so as to cancel the azimuth before the blur correction. The second method is to rotate the filters in the first to the n-th layers in accordance with the azimuth of the partial area to be corrected.

In addition, it is desirable that the information of the optical degradation used at the time of the learning does not contain a distortion component. This is because the blur correction model of FIG. 1 does not suppose that the object in the partial area leaves out of the area before and after the correction or the object outside the area enters into the area. Therefore, except for a case where a distortion aberration is sufficiently small with respect to the size of the partial area, it is desirable that the distortion aberration is ignored in the learning and the blur correction, and application of distortion correction processing is separately performed after the blur correction according to the present invention is performed. At this time, the image height used in the learning and the blur correction is considered as an image in a state in which the distortion aberration is included. That is, when the distortion is negative, 100% image height indicates a position larger than 100% after the distortion correction. It should be noted that it is not necessary to previously add the distortion aberration to the reference image at the time of the learning. In addition, although the distortion correction processing can be performed before the blur correction, since interpolation processing is inserted before the blur correction in this case, it is desirable that the distortion correction processing is performed after the blur correction.

In a case where the partial area includes a plurality of channels and those channels are collectively input to the network structure, it is similarly desirable that a chromatic aberration of magnification is not included in the information of the optical degradation at the time of the learning. This reason is that the object is moved into or out of the partial area as it is the same as the distortion. It should be noted however that the chromatic aberration of magnification is corrected from the blurred image before the blur correction according to the present invention is used, which is different from the distortion aberration. That is, the first linear conversion is preferably executed after the chromatic aberration of magnification in the partial area is corrected. This is because, if the chromatic aberration of magnification is not previously corrected, there is a possibility that the edge becomes double edges or the like. It should be noted that, in a case where the blur correction is individually performed in each channel even when the partial area includes the plurality of channels, the above-described problem does not occur.

In addition, a devisal for improving the performance of the CNN may be used in combination together with the present invention. For example, in a case where the number of the reference images is not sufficient, data argumentation in which various modifications are applied to the reference image to increase the learning data may be used. Alternatively, to improve the learning accuracy, ZCA whitening in which an average value of the pixels of the reference image is normalized to 0, and a dispersion is normalized to 1 to eliminate redundancy of adjacent pixels or the like may be used in combination. The data argumentation and the ZCA whitening are respectively described in detail in NPL 4 and NPL 5.

The image processing method according to the present embodiment is executed in accordance with a program for causing the image pickup apparatus 100 to function as a computer that executes the image processing method according to the present embodiment. It should be noted that the program may be recorded, for example, in a computer-readable recording medium.

With the above-described configuration, it is possible to provide the image pickup apparatus that can highly accurately correct the optical degradation of the image shot by using the image pickup apparatus while also suppressing the adverse effects.

Second Embodiment

Descriptions will be given of a second embodiment in which the image processing method according to the present invention is applied to an image processing system. According to the second embodiment, an image processing apparatus that performs the blur correction of the present invention, the image pickup apparatus that obtains the blurred image, and the server that performs the learning individually exist. In addition, the defocus is dealt with as the optical degradation to be corrected.

Figure 6:
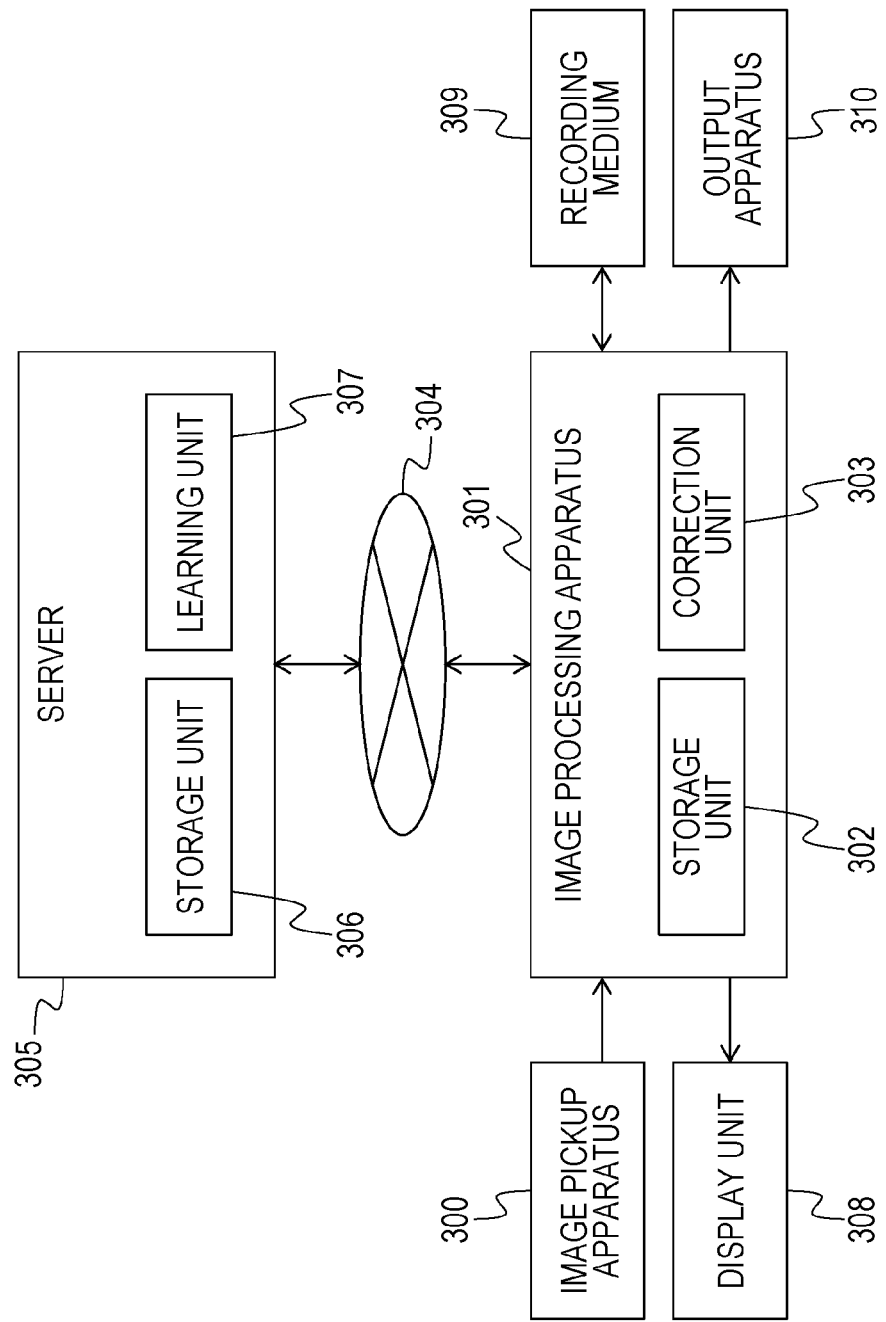
FIG. 6 is a block diagram of an image processing system according to the second embodiment.
Figure 7:
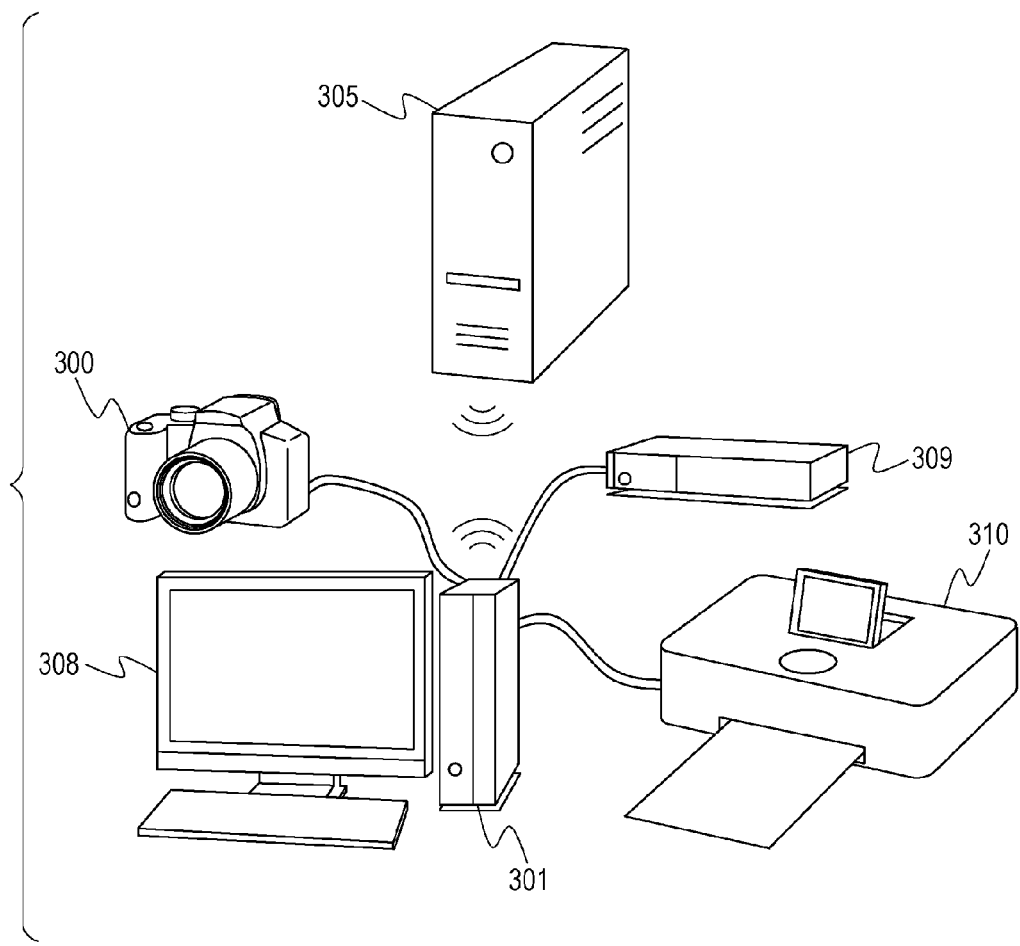
FIG. 7 is an external appearance view of an image processing system according to the second embodiment.

FIG. 6 illustrates a basic configuration of the image processing system according to the second embodiment. FIG. 7 illustrates an external appearance of the image processing system according to the second embodiment. An image pickup apparatus 300 includes a depth map obtaining unit that obtains a depth map of the object space (information related to a distribution of object distances). As a configuration for obtaining the depth map, for example, an image pickup system having a plurality of viewpoints using parallax (such as a multiple-lens camera or a plenoptic camera), ToF (Time of Flight), DFD (Depth from Defocus), or the like is familiar. The other basic configuration of the image pickup apparatus 300 is similar to that illustrated in FIG. 2 except for an image processing unit related to the blur correction and the learning.

The blurred image (input image) shot by the image pickup apparatus 300 and the shooting condition information (including the depth map) are stored in a storage unit 302 in an image processing apparatus 301. The image processing apparatus 301 is connected to a network 304 in a wired or wireless manner and accesses a similarly connected server 305. The server 305 includes a learning unit 307 that learns the correction information for correcting the optical degradation generated by the image pickup apparatus 300 and a storage unit 306 that stores the correction information. The image processing apparatus 301 obtains the correction information from the storage unit 306 of the server 305 and corrects the optical degradation of the blurred image by a correction unit 303.

The generated corrected image is output to at least any one of a display unit 308, a recording medium 309, and an output apparatus 310. The display unit 308 is, for example, a liquid crystal display, a projector, or the like. A user can perform the operation while checking an in-process image via the display unit 308. The recording medium 309 is, for example, a semiconductor memory, a hard disc, a server on a network, or the like. The output apparatus 310 is a printer or the like. The image processing apparatus 301 may have a function of performing development processing or the other image processing when necessary.

Figure 8:
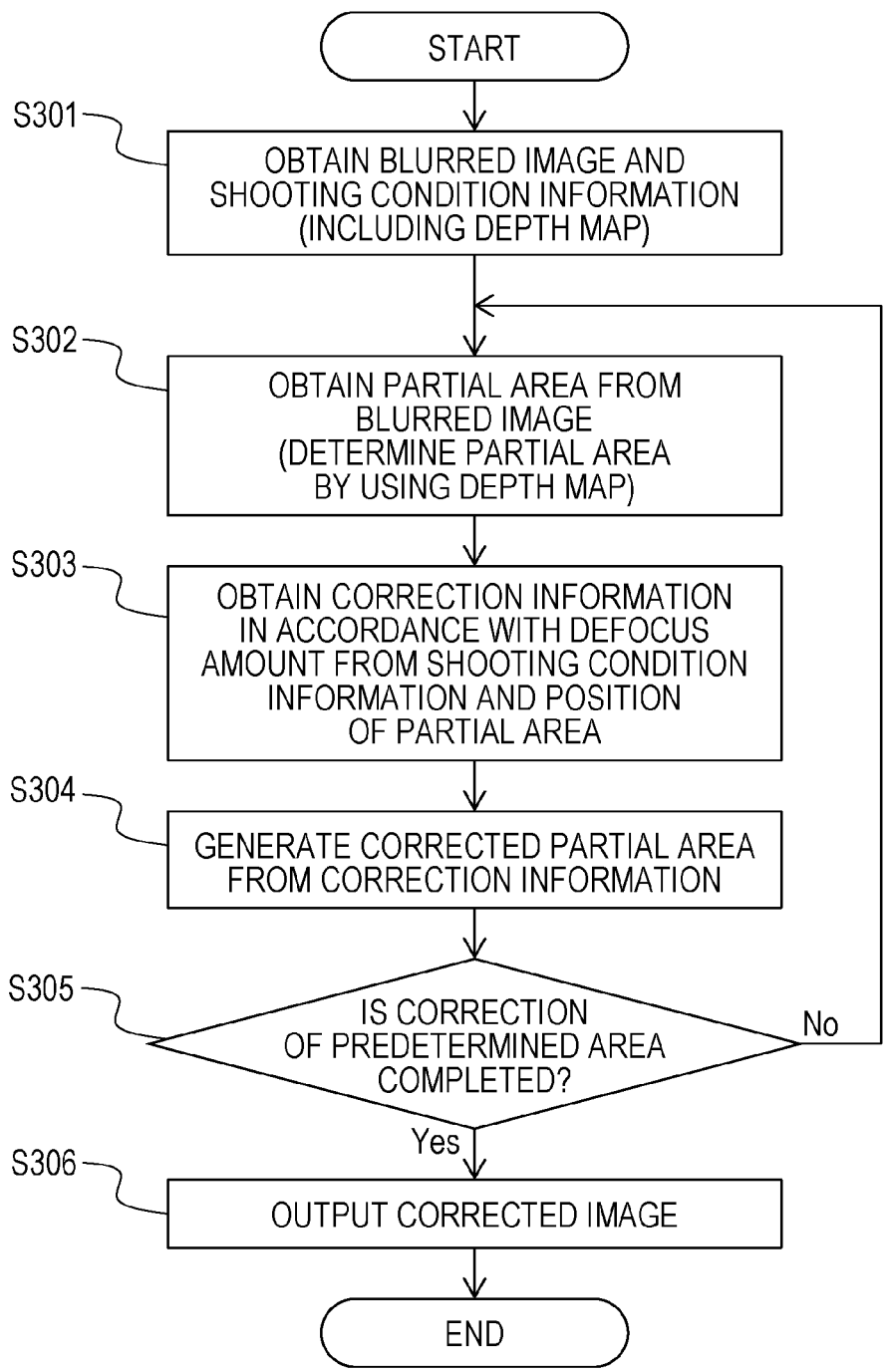
FIG. 8 illustrates the flow of the blur correction according to the second embodiment.

Next, blur correction processing performed by the correction unit 303 will be described by using a flow chart of FIG. 8.

In step S301, the blurred image shot by the image pickup apparatus 300 and the shooting condition information including the depth map of the blurred image are obtained. In addition, according to the present embodiment, since the image pickup apparatus 300 is a lens interchangeable type camera, identification information of the lens that is mounted at the time of the shooting is also included in the shooting condition information.

In step S302, while the depth map obtained in step S301 is used, the partial area is obtained from an area where distances are regarded to be substantially the same (area where the correction can be performed by using the same correction information).

In step S303, the correction information in accordance with the defocus amount of the partial area is obtained from the shooting distance (focus state) at the time of the shooting and the distance information of the object (depth information) in the partial area. Since the object distance varies depending on the position of the partial area, the correction information varies depending on the position of the partial area. In addition, since vignetting of an imaging optical system included in the image pickup apparatus 300 is changed depending on the image height, a blurred image is changed even at the same defocus amount in accordance with the image height. For this reason, the correction information is determined on the basis of the image height.

Figure 9:
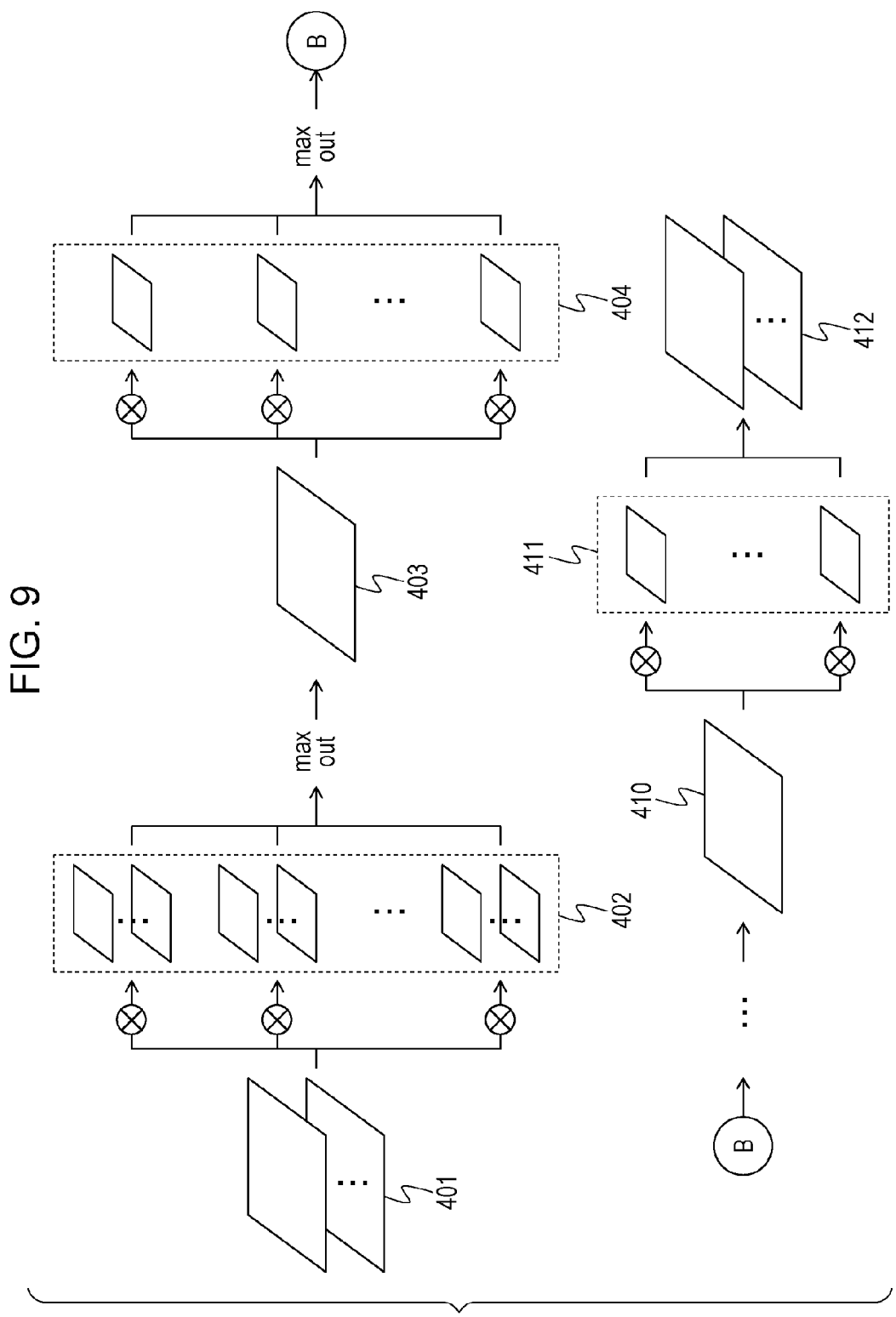
FIG. 9 illustrates a network structure of the blur correction according to the second embodiment.
Figure 10:
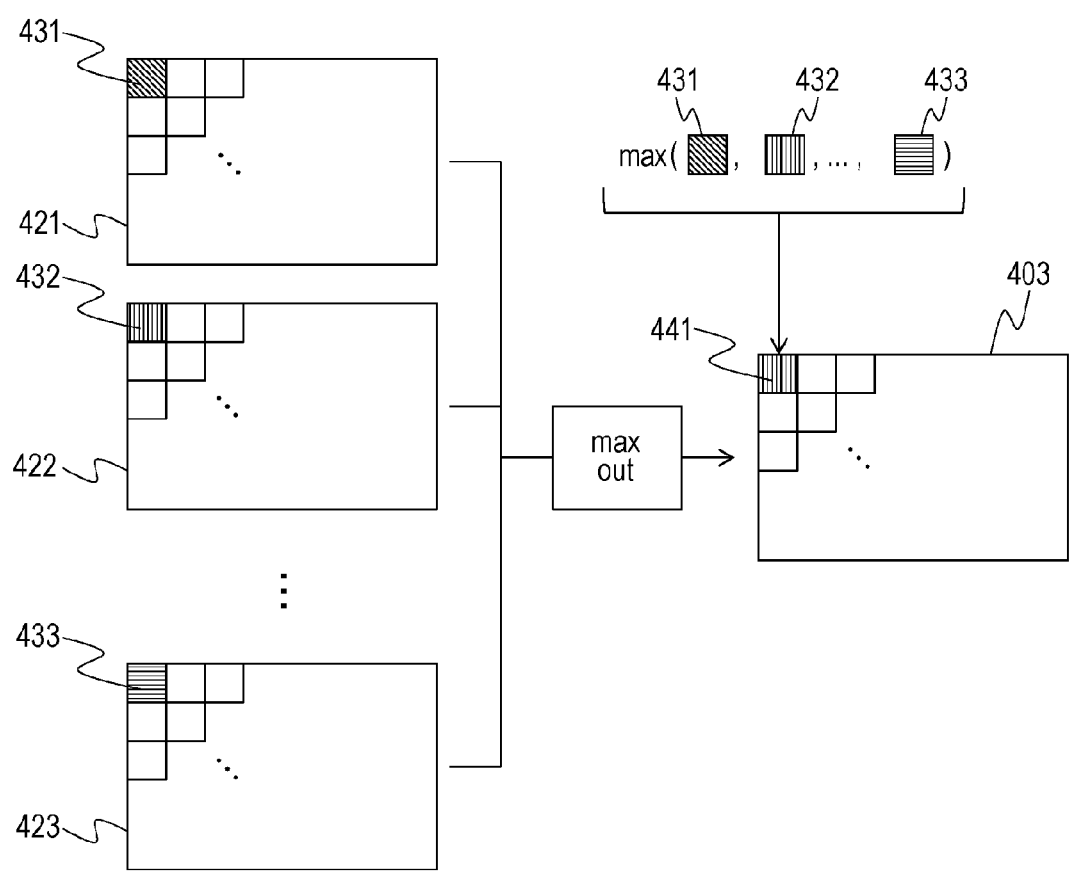
FIG. 10 is an explanatory diagram for describing an activation function according to the second embodiment.

In step S304, the corrected image in which the blur caused by the defocus is corrected is generated by using the network structure illustrated in FIG. 9. A difference between the network structure according to the present embodiment illustrated in FIG. 9 and the network structure illustrated in FIG. 1 according to the first embodiment is that the max out is used as the activation function. The convolution with a partial area 401 and each of a plurality of filters 402 in the first layer is operated, and a constant is further added (first linear conversion). Respective coefficients of the filters 402 and the constant are determined by the correction information. Results of the respective linear conversions are input to the activation function (max out). Descriptions of the max out will be described by using FIG. 10. The max out is the activation function for outputting a maximum value with respect to each of the pixels of linear conversion results 421 to 423. For example, in an output 403 of the max out in the first layer (first conversion partial area), a pixel 441 takes the maximum value among pixels 431 to 433 at the same position in the linear conversion results 421 to 423. That is, the max out is a MAX function in which the linear conversion results 421 to 423 are set as arguments, the maximum value among the arguments is output to each pixel. In addition, the number of channels of the first conversion partial area 403 becomes 1 from its character. Descriptions of the second layer and subsequent layers in FIG. 9 are similar to FIG. 1.

In step S305, a determination on whether or not the blur correction is completed with respect to the predetermined area in the blurred image. In a case where the partial area where the blur correction is not performed exists in the predetermined area, the flow returns to step S302, and the partial area where the blur correction is not performed is obtained, and the processing of generating the corrected partial area is performed (steps S303 and S304). In a case where the blur correction is completed in the entire area of the predetermined area, the flow proceeds to step S306.

In step S306, the corrected image in which a focus deviation is corrected by the defocus correction or the corrected image in which a depth of field is extended is output.

Figure 5:
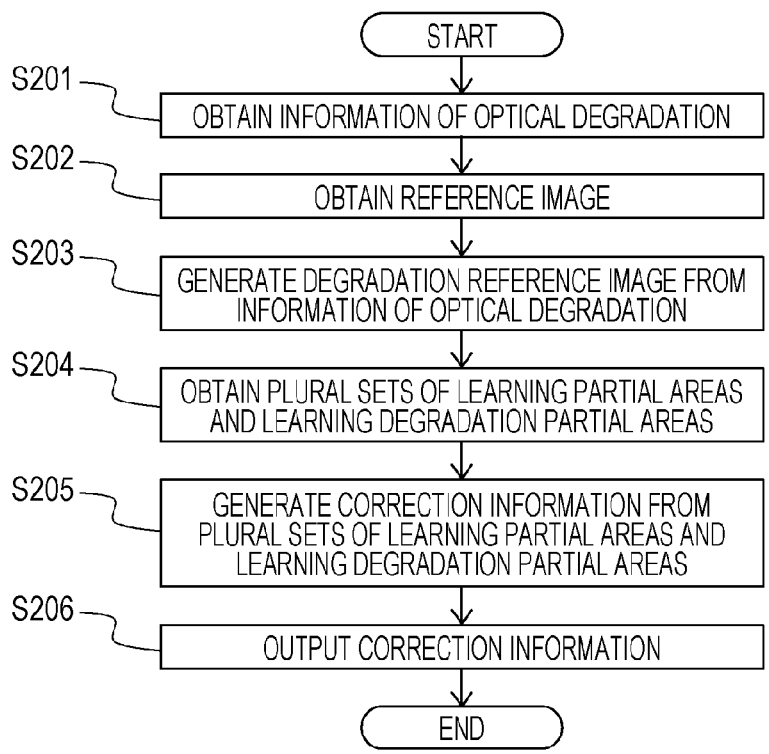
FIG. 5 illustrates a learning flow of correction information according to the first and second embodiments.

The correction information used in the blur correction is learnt in accordance with the flow chart illustrated in FIG. 5 similarly as in the first embodiment. According to the present embodiment, the blur caused by the defocus is set as a correction target. For this reason, in the obtainment of the information of the optical degradation (step S201), the focal length (variable power state), the aperture value (aperture state (including the vignetting)), the shooting distance (focus state), the information related to the blur of the defocus determined on the basis of the distance information of the object is obtained. Since steps S202 to S206 are similar to the first embodiment, descriptions thereof will be omitted.

The image processing method according to the present embodiment is executed in accordance with a program for causing the image processing apparatus 301 to function as a computer that executes the image processing method according to the present embodiment. It should be noted that the program may be recorded, for example, in a computer-readable recording medium.

With the above-described configuration, it is possible to provide the image pickup system that can highly accurately correct the optical degradation of the image pickup apparatus while also suppressing the adverse effects.

The preferred embodiments of the present invention have been described above, but the present invention is not limited to these embodiments, and various modification and alterations can be made within the scope of its gist.

That is, the image processing method of correcting the aberration and the diffraction as illustrated according to the first embodiment can be executed in the image processing system as illustrated according to the second embodiment, and also the image processing method according to the second embodiment can be executed in the image pickup apparatus illustrated according to the first embodiment. In addition, all of the blurs caused by the aberration and the diffraction and the defocus may be corrected as the optical degradations.

In addition, the blurred image shot by the image pickup apparatus and the shooting condition information may be transmitted from the image pickup apparatus or the image processing apparatus connected to the image pickup apparatus in a wired or wireless manner to the server on the network, and the image processing method according to the present invention may be executed in the server on the network. The corrected image generated by the server on the network can be obtained while the image pickup apparatus or the image processing apparatus accesses the server.

According to the present invention, it is possible to correct the optical degradation in the shot image at a high accuracy while also the adverse effects are suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2016/074723, filed Aug. 25, 2016, which is hereby incorporated by reference herein in its entirety.

The invention claimed is:

1. An image processing method comprising:
    a step of obtaining a partial area of an input image shot by using an image pickup apparatus;
    a step of obtaining previously learnt correction information varying in accordance with a position of the partial area; and
    a correction step of generating a corrected partial area in which an optical degradation of the partial area caused by the image pickup apparatus is corrected by using the partial area and the correction information,
    wherein the correction information is a learnt model of a convolutional neural network, and
    wherein, when N is set as an integer higher than or equal to 2 and n is set as an integer from 1 to N, the correction step includes generating intermediate data by sequentially executing, with respect to the partial area, an n-th linear conversion by using each of a plurality of linear functions based on the correction information and an n-th non-linear conversion by using a non-linear function until n becomes N from 1, and generating the corrected partial area by executing the (N+1)-th linear conversion with respect to the intermediate data by one or more linear functions based on the correction information.

2. The image processing method according to claim 1, wherein the first to the n-th linear conversions include a convolution with each of a plurality of filters based on the correction information.

3. The image processing method according to claim 2, wherein a different filter is used each time the conversion is executed.

4. The image processing method according to claim 2, wherein:
    the (N+1)-th linear conversion is the convolution with one or more filters; and
    sizes of the filters in the respective first to the (N+1)-th linear conversions are determined on the basis of information of the optical degradation.

5. The image processing method according to claim 2, wherein:

the (N+1)-th linear conversion is the convolution with one or more filters; and when a spread of a point spread function corresponding to the optical degradation is set as d, and one-dimensional sizes of the filters in the respective first to the (N+1)-th linear conversions is set as $s_1$ to $s_{N+1}$, the following condition expression is satisfied:

$$0 < d\left(-N + \sum_{m=1}^{N+1} s_m\right)^{-1} \le 1.$$

6. The image processing method according to claim 1, wherein:
the number of filters used in the intermediate data is the same as the number of channels of the partial area; and
each channel component of the corrected partial area is calculated by an operation including the convolution with the intermediate data and each of the filters.

7. The image processing method according to claim 1, wherein the non-linear function includes a monotonically increasing function or a MAX function for outputting a maximum value among arguments.

8. The image processing method according to claim 1, wherein a size of the partial area is determined by the information of the optical degradation.

9. The image processing method according to claim 1, wherein:
the correction information obtains the same value with respect to the partial area where the image height is the same; and
the correction step is executed after the partial area is rotated.

10. The image processing method according to claim 2, wherein:
in the step of obtaining, the same correction information is obtained for partial areas, the image heights of which are the same; and
the correction step is executed after the plurality of filters based on the correction information are rotated.

11. The image processing method according to claim 1, wherein the correction information is obtained by learning by using a reference image and the information of the optical degradation.

12. The image processing method according to claim 11, wherein the reference image used for the learning includes an image having a dynamic range higher than a dynamic range of the input image.

13. The image processing method according to claim 11, wherein the correction information is obtained by generating a degradation reference image from the reference image by using the information of the optical degradation and learning by using a plurality of sets of partial areas of the reference image and partial areas of the degradation reference image.

14. The image processing method according to claim 13, wherein the correction information is obtained by learning by using a plurality of sets of partial areas of the reference image and partial areas of the degradation reference image to which noise is added.

15. The image processing method according to claim 11, wherein the information of the optical degradation used for the learning does not include the distortion aberration.

16. The image processing method according to claim 15, wherein correction processing of distortion aberration is performed with respect to a correction image obtained by generating the corrected partial areas for the respective partial areas of the input image.

17. The image processing method according to claim 1, wherein:
the partial area has a plurality of channels; and
the correction step includes executing the first linear conversion after a chromatic aberration of magnification of the partial area is corrected.

18. The image processing method according to claim 1, wherein:
the partial area has a plurality of channels;
the correction information is a different value depending on the channel; and
the correction step is executed for each channel of the partial area.

19. The image processing method according to claim 1, wherein:
the 1st linear conversion is executed with respect to the partial area,
the n-th non linear conversion is executed with respect to a result of the n-th linear conversion,
the n-th linear conversion, except a case where n is equal to 1, is executed with respect to a result of the (n−1)-th non linear conversion.

20. An image processing apparatus comprising:
a processor configured to execute a plurality of tasks, including:
an obtaining task configured to obtain a partial area of an input image shot by using an image pickup apparatus, and previously learnt correction information varying in accordance with a position of the partial area; and
a correction task configured to generate a corrected partial area in which an optical degradation of the partial area caused by the image pickup apparatus is corrected by using the partial area and the correction information, and
a storage configured to stores the correction information,
wherein the correction information is a learnt model of a convolutional neural network, and
wherein, when N is set as an integer higher than or equal to 2 and n is set as an integer from 1 to N, the correction task is configured to generate intermediate data by sequentially executing, with respect to the partial area, an n-th linear conversion by using each of a plurality of linear functions based on the correction information and an n-th non-linear conversion by using a non-linear function until n becomes N from 1, and generate the corrected partial area by executing the (N+1)-th linear conversion with respect to the intermediate data by one or more linear functions based on the correction information.

21. An image pickup apparatus comprising:
an image obtaining unit that obtains an image of an object space as an input image; and
the image processing apparatus according to claim 20.

22. A non-transitory computer-readable storage medium that stores a program for causing a computer to execute image processing,
wherein the image processing method according to claim 1 is executed as the image processing.

* * * * *